Patented July 17, 1934

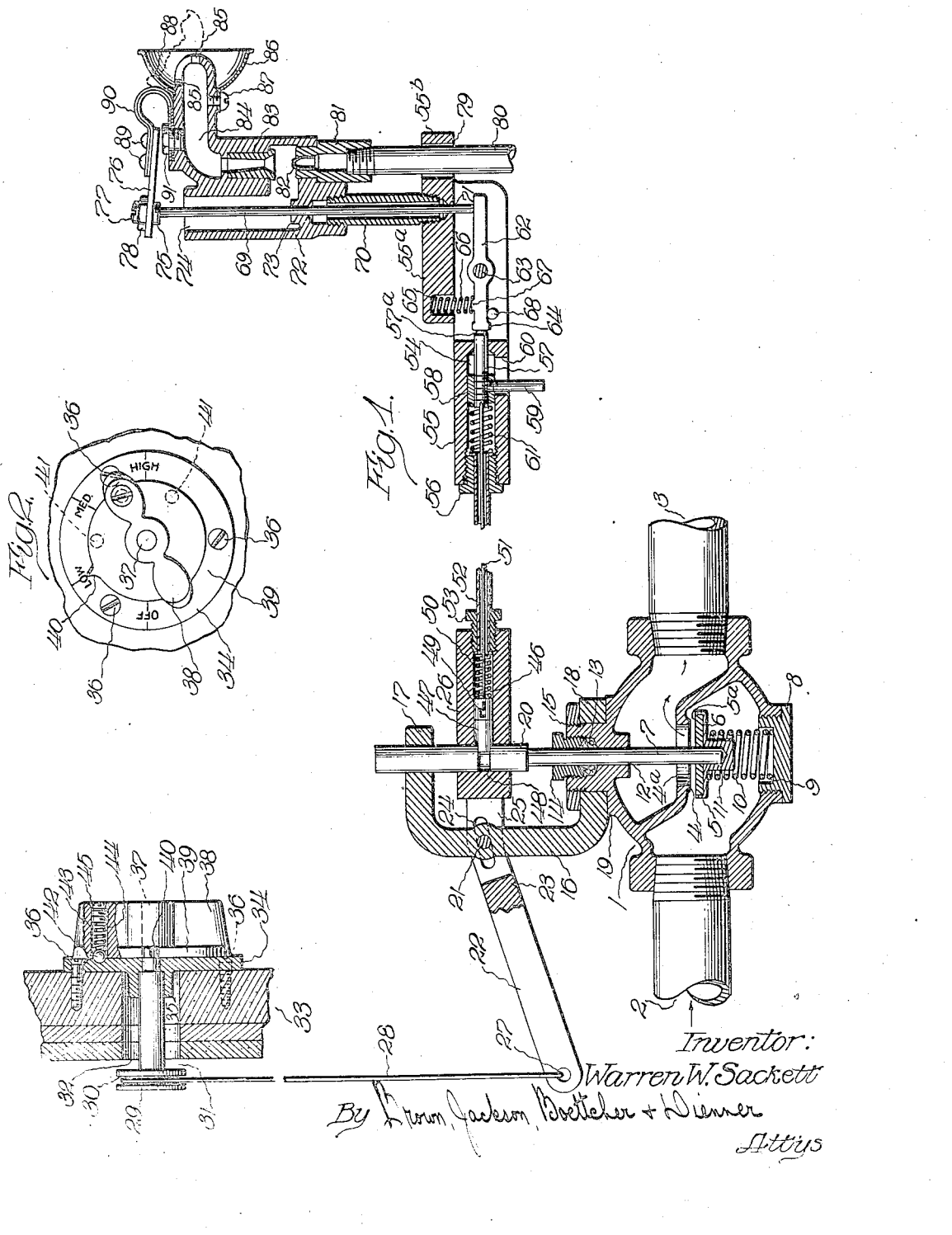

1,966,735

UNITED STATES PATENT OFFICE 1,966,735

REMOTE CONTROLLED SAFETY VALVE

Warren W. Sackett, Milwaukee, Wis., assignor to Milwaukee Gas Specialty Company, Milwaukee, Wis., a corporation of Wisconsin Application August 13, 1931, Serial No. 556,740

20 Claims. (Cl. 158—117.1)

This invention relates to safety valves, and more particularly to safety valves adapted for remote manual control, such as are used for burner control or wherever the use of a pilot igniter is required for automatic ignition purpose.

More particularly this invention relates to a simple and inexpensive device for use with gas burners or other heaters having a pilot igniter therefor and the present device is operable to shut off automatically the heater supply when the pilot igniter is extinguished and to prevent establishing the heater supply with the pilot igniter extinguished or out of operation.

Generally stated, the present invention is intended for use as a burner control or similar heat control and consists primarily of a safety pilot head, a fuel supply valve, a manual control for the valve and a setting mechanism positioned in such relationship that the fuel supply valve will be automatically shut off and prevented from being set in open position if for any reason the pilot flame is extinguished.

The devices heretofore provided for effecting furnace or heater control by means of a pilot igniter are either of a strictly manually operated type, without a safety control or attachment, or are the more complicated and expensive ones that are operated by diaphragm valves, electric valves with pressure control, or by electric pilots.

It is the purpose of the present invention to provide a simple and inexpenive device that may be easily installed and maintained. The device is adapted for use on furnaces, heating devices such as gas ranges or ovens, baking devices and enameling ovens, or elsewhere as suitable or desired.

In order to acquaint those skilled in the art with the construction and operation of the present invention I shall now describe an embodiment of the same in connection with the accompanying drawing, in which:

Figure 1 is a more or less schematic sectional view, partly in elevation and showing the different portions of the apparatus arranged in operative position; and Figure 2 is a view of the room control for the valve illustrated in Figure 1.

Referring to the drawing, reference numeral 1 indicates generally a fuel supply valve for supplying gaseous fuel or the like to a furnace, oven, or the like. This valve 1 has an inlet opening designated at 2 and an outlet 3 leading to the burners for the furnace or oven. Within the valve 1 is the usual valve seat 4, surrounding port 4a and arranged within the valve body, centrally thereof. Cooperable with seat 4 is a valve 5 which has a hard leather or metallic seating ring 5a. The lower end of the valve stem 7 seats in a recess at the axis of the hub formed integrally with the valve.

The valve body has a removable plug 8 threaded into the bottom portion thereof, and recessed as at 9 to form a seat for the spring 10. This spring 10, which may be of a coiled or other suitable type, is adapted to fit around the projecting boss 11 on the valve member 5 and bears against the under surface of the valve 5, tending normally to close the same.

The valve stem 7 projects upwardly through an opening 12 in the valve body and through a packing gland comprising a packing 13 and a gland nut 14 threaded into the upper end of the recess in the valve body. A lock nut 15 is threaded upon the upper end of the threaded projection on the valve body 1, and provides means for securing a U-shaped hanger member 16 to the valve body.

This hanger 16 is provided with two outwardly extending arms 17 and 18, the arm 17 having an opening therein through which the upper portion 20 of the valve stem 7 is adapted to pass. The lower arm 18 of the bracket or hanger 16 is formed so as to fit around the projection on the valve body and to rest upon a seat-like or flattened portion 19 of the valve. The valve stem 7 has the enlarged portion 20 which passes upwardly through the arm 17 of the hanger 16.

The hanger 16 is provided with a pivot pin 21, positioned in its upright portion, and the lever arm 22 is bifurcated as indicated by the section 23, and has a slot 24 through which pivot pin 21 extends. One end of the arm 22 carries a latch housing 26, and the other end of the arm 22 has an opening 27 therein adapted to receive and engage a cable 28. The other end of the cable 28 is secured to a pulley 29, having the groove 30 therein in which the cable 28 is adapted to be wound.

The pulley 29 is mounted upon a shaft 31 which projects through an opening 32 in the wall or panel 33. This wall 33 may be an ordinary wall or a panel or other support for mounting the control mechanism for the burner. It is preferably located on one of the lower floors of the building which is to be heated by the burner, or in convenient proximity to the supply valve. A plate 34 having a hollow hub 35 adapted to receive the shaft 31 is secured to the panel 33 by means of screws 36, or in any other convenient or suitable manner. The shaft 31 has a reduced end 37 extending through the plate 34. This reduced end 37 has a control knob 38 mounted thereon and rigidly secured thereto in any suitable manner. The control knob 38 has a lower flange portion 39 integral with the control knob. This flange portion 39 is provided with an indicating projection 40 as shown in the drawing.

The plate 34 has recesses 41 formed therein, as shown in Figure 2, for receiving a ball 42. This ball 42 is positioned at the adjacent end of an opening 43 in the knob 38 and is engaged selectively in recesses in plate 34 at the "off", "low", "medium" and "high" positions, the spring 44 being held in position by the set screw 45. The engagement of the ball 42 in the recesses 41 of the plate 34 holds the control knob 38 in any set position. The control knob is so mounted that it may be turned to set the valve in any of the positions marked on the plate 34.

Rotation of the control knob 38 to any of the positions hereinbefore described causes control shaft 31 to turn about its axis, which in turn causes rotation of the pulley 29. Rotation of the pulley 29 by the knob 38 causes the arm or lever 22 to rotate in a clockwise direction about the pivot 21. This rotation causes the member 26 to be forced downwardly through the slot connection 24.

The latch housing 26 is a substantially cylindrical member having an opening 46 extending axially thereof and opening into the diametrical opening through which the valve stem 20 extends. Positioned within the opening 46 is a latch member 47 adapted to engage with an annular groove 48 in the valve stem 20. A spring 50 is provided for forcing the latch member 47 into the annular groove 48, the latch means 47 being slidable in the opening 46 and has a slot 49 formed therein for receiving one end of an operating wire 51.

The operating wire 51 extends from the latch member 47 through a flexible tubing 52, which may be any suitable flexible protecting tubing. The tubing is held in place in the opening 46 by means of a clamping nut 53 threaded into the end of the opening 46. The other end of the operating wire 51 enters an opening 54 in the body 55 which contains the valve setting mechanism. This end of the flexible tubing 52 which surrounds the operating rod 51 is secured in the housing 55 by means of a clamping nut 56. This is similar to the attachment of the tubing 52 to the housing 26.

The end of the operating rod 51 which enters the housing 55 is attached to a plunger 57 threaded into a sleeve 58 adapted to having sliding movement in the opening 54. Extending downwardly from the sleeve 58 and threaded into the lower portion thereof is a set pin 59 which projects through a longitudinal slot 60 formed in the bottom of the housing 55. This pin 59 is adapted to be moved back and forth in the slot 60, thereby moving the sleeve and plunger back and forth in the opening or channel 54. A spring 61 is positioned between the nut 56 and the sleeve 58 and normally tends to force the sleeve 58 to the right.

A lever arm 62, pivoted on a pin 63 which is mounted on a web portion formed integral with the housing 55, has an enlarged end 64 adapted to contact with the bevelled or rounded end 57a of the plunger 57 to limit the forward movement of the plunger. A raised portion 55a of the body 55 is recessed at 65 to provide a seat for a spring 66. The other end of the spring 66 fits around a boss 67 on the adjacent end of the lever 62 and tends to force the lever arm 62 against the stop pin 68, this stop 68 being so positioned that when the lever 62 comes into contact with it the lever is in a substantially horizontal position, with the enlarged end 64 abutting against the end 57a of the plunger 57. In this position, the spring 61 is compressed and the pin 59 is at the left end of the slot 60. This position of the push rod 57 causes the latch member 51 to be pushed by the spring 50 into position for engagement in the annular groove 48 in the valve stem 20.

The spring 50 in the housing 26 is considerably weaker than the spring 61 in the housing 55, and therefore, when the lever arm 62 is rotated out of engagement with the end 57a of the push rod 57, the spring 61 forces the sleeve 58 and push rod 57 to the right, compressing the spring 50 and withdrawing the latch member 47 from the groove 48. With the latch member 47 withdrawn from the groove 48, the spring 10 below the valve 6 forces the valve and associated valve stem upwardly and seats the valve upon the valve seat 4, thus closing the valve.

At its opposite end, the lever 62 has contact with a motion transmitting rod 69, this rod being movable in a substantially vertical direction. Threaded into the housing 55a is a rod housing 70, which extend vertically from said housing and is coaxial with a tapped opening 71 in the housing 55a. The tapped opening 71 serves as a lower guide portion for the rod 69. At its upper end the rod housing 70 is threaded into a pilot head housing 72, which pilot head supports the pilot burner structure. A bearing portion 73, coaxial with the rod housing 70, forms an upper guide for the rod 69. The rod 69 is adapted to have sliding movement through the guides 73 and 71.

The upper end of the rod 69 passes through an enlarged air channel or opening 74 in the housing 72, and at its extremity is provided with an enlarged cap 75 adapted to support a rigid link or strip 76. An adjusting screw 77 and a lock nut 78 secure the strip to the rod 69. The adjusting screw 77 is adapted to adjust the distance that the rod 69 projects through the lower guide portion 71 for a given position of the strip 76.

The housing 55a has an extending portion 55b which is provided with an opening 79 adapted to act as a support or guide for a pilot burner supply pipe 80. The pilot supply pipe 80 extends upwardly through the opening 79 and is threaded into the interior of the spud 81 which is secured in the pilot head, 72.

The pilot supply pipe 80 supplies the gas for pilot purposes through the safety head. In the illustrated embodiment of the invention approximately one foot per hour gas supply through the pipe 80 is suitable, but this, of course, may vary widely. The spud 81 is recessed interiorly at its upper end to receive a jet member or tip 82 for projecting a stream of gas from the supply pipe 80 up into a Venturi bushing 83 secured in the housing 72. The gas from the pipe 80 is mixed in the Venturi opening with a stream of air which enters the housing through the open end of the channel 74 and passes downwardly along the jet 82 and mixes with the gas and passes up through the Venturi tube to the equalizing chamber 84, where the pressure remains practically constant, regardless of the quantity or velocity of the gas and air mixture passing through the Venturi opening. The mixture then passes from the chamber 84 through the ports 85—85 where it is ignited and burns, as a blue flame, as shown by the dotted lines in Figure 1.

The flame is protected against drafts or outside influences by a bell-shaped hood 86 which is positioned about the ports 85 and is secured to the housing 72 by means of a screw 87. The hood 86 is provided on its uppermost surface with an opening 88 through which part of the pilot flame passes, as shown in Figure 1.

Secured to the strip 76 by means of rivets 89, or in any other suitable manner, is a bi-metallic strip 90, preferably formed of two metals welded or soldered together and which have unequal coefficients of expansion. The metal having the greater coefficient of expansion is positioned on the inside of the rounded portion of the strip 90. The opposite end of the strip 90 is adapted to be secured to the top of the housing 72 by means of a stud bolt 91 threaded thereinto. The strip 90 is rounded so that it projects slightly over the opening 88 in the dome or hood 86, and this rounded portion is adapted to be acted upon by a portion of the burner flame issuing from the pilot burner 85.

In the operation of my device, assuming that the pilot flame is not burning, the valve guide 17 may be set into the correct position by means of the control knob 38 and the associated pulley and lever arm 22. The valve, however, at this time is not opened or set by the setting of the guide 17 because the latching member 47 is not engaged in the groove 48 and housing 26 moves free of the stem 20. Upon lighting the pilot light the flame thereof, acting upon the bi-metallic strip 90, causes the strip to tend to straighten, which tendency is conveyed to the rod 69 by means of the strip 76. This causes the rod to be lifted vertically, this vertical movement allowing the spring 66 to press the lever arm 62 into the horizontal position shown. The pin 59 is then pushed to position at the left of the slot 60 (as shown) and until the end 57a of the plunger 57 slides past the enlarged end 64 of the lever arm 62 and abuts endwise against the adjacent end of this arm. The lever arm 62 is then in a substantially horizontal position, and the rod 69 has been moved to a position permitting this positioning of the lever arm 62. In this position the spring 61 is compressed and the operating rod 51 is forced to the left. This causes the latching member 47 to be forced tightly up against the valve stem 20. Then by pushing the valve stem downwardly until the latching member 47 slides into the groove 48 of the stem 20, the valve is opened and held in the position for which the dial is set. The supply of fuel gas to the burners is thus provided, and the burners can be ignited by means of the pilot flame issuing from the port 85 of the burner structure. Obviously, if the pilot flame is extinguished it may be ignited first to engage the latch 47 in the notch 48, and then by turning the dial the stem 20 will move with the housing 26 and the valve may be set in the desired position.

If for any reason the pilot flame is accidentally extinguished, the bi-metallic strip 90 becomes cooled and tends to resume its closed form. This results in the link 76 pushing downwardly upon the rod 69, the lower end of the rod thus forcing the contacting lever arm 62 downwardly. This rotates the lever arm 62 about the pivot 63 against the pressure of the spring 66, and if the amount of rotation is sufficient, as is the case when the pilot flame is extinguished, the enlarged end 64 of the lever arm 62 slides past the end 57a of the push rod 57 and allows the push rod 57 to be moved to the right by the pressure of the spring 61. This causes the operating rod 51 to be moved to the right also, withdrawing the latching mechanism 47 from the groove 48. When the latching mechanism is withdrawn the stem 20 is released from the housing 26 and its operating fork, and the spring 10 forces the valve member 5 to closed position against the valve seat 4. This results in the supply of fuel to the burner being cut off automatically, thus preventing any danger of asphyxiation or explosion.

In order to reset the valve, all that is required is to reignite the pilot flame issuing from the port 85. The portion of the flame coming through the opening 88 and contacting with the metal strip 90 causes the metal strip to straighten, which results in the rod 69 being lifted and allowing the lever arm 62 to reassume its horizontal position, the control rod 59 being pushed to the left as far as possible in the slot 60. When the enlarged end 64 of the lever arm 62 slides past the end 57a of the push rod or plunger 57 and comes into endwise abutting engagement with the end 57a, due to the pressure of the spring 61, whereupon the valve stem 20 and housing 26 are connected or latched together and the valve member 5 is set in the desired position as previously described and the burners are re-ignited.

Thus is can be seen that I have provided a novel method of controlling a fuel supply valve. If the pilot light becomes accidentally extinguished the setting mechanism must be manually adjusted and the pilot re-ignited in order to open the fuel supply valve and hold or maintain same open. The result of this is that the burner supply is shut off automatically whenever the pilot is extinguished and cannot be turned on and maintained turned on unless the igniter is ignited.

I do not intend to be limited to the exact details shown and described herein, but only insofar as limited by the spirit and scope of the claims appended hereto.

I claim:

1. In combination, a valve having a valve member provided with a grooved valve stem, a pivoted latch carrier fitting about and shiftable axially with respect to said stem, means including a remotely disposed control member for rocking said carrier about its pivot and reciprocatory latch means carried within said carrier and engageable with the groove in said valve stem to connect said stem for movement with said carrier.

2. In combination, a valve having a valve member provided with a valve stem having a groove therein, a shiftable latch carrier through which said stem extends, means for shifting said carrier, a thermal sensitive device, an igniter adjacent said thermal sensitive device and latch means carried by said carrier and engageable with the groove in said valve stem to connect said stem for movement with said carrier, said latch means being under the control of said thermal sensitive device for automatically disconnecting said carrier from said valve stem when said igniter is extinguished, and spring means normally urging said valve member to closed position.

3. In combination, a valve having a valve member provided with a valve stem, a pivoted lever slidably receiving said stem, a control knob connected with said lever and adapted for manual control, a latch device carried by said lever and engaging said stem, a pilot head having a pilot outlet for maintaining a pilot flame, a thermal sensitive member disposed in proximity to said pilot outlet and connected to said latch device, said thermal sensitive member releasing said latch device from engagement with said valve stem upon extinguishment of said pilot flame, and spring means normally urging said valve member to closed position.

4. In combination, a valve having a valve member provided with a valve stem spring means normally tending to close said valve, a pivoted lever having one end thereof slidably receiving said stem, a manually operable control knob connected with said lever, a latch device carried by said lever connecting said lever directly to said stem and operable to disconnect the lever from the stem, a pilot head having a pilot outlet for projection of a pilot flame, a thermal sensitive member disposed in proximity to said pilot outlet and connected to said latch device, said latch being interposed in a fuel supply line, and a fuel supply to said pilot through said pilot head.

5. In combination, a housing supporting a pilot structure, thermally responsive means mounted on said housing a motion transmitting rod connected at one end to said thermally responsive means and movable therewith, a second housing supporting the other end of said rod, a lever pivoted to said second housing and engaging the lower end of said rod, a plunger positioned to have abutting engagement endwise with said lever, a sleeve slidable in said housing and mounting said plunger, a control pin connected to said sleeve for moving said plunger, an operating wire attached at one end to said plunger and movable therewith, latch mechanism associated with the other end of said operating wire, a fuel supply valve, a valve stem therefor, a bracket for supporting said valve stem, said valve stem having a groove portion positioned to engage said latch mechanism, and means for controlling the position of said valve when said latch mechanism is in cooperating engagement with said valve stem.

6. In combination, means for supporting a pilot structure, thermally responsive means associated therewith, means for transmitting movement of said thermally responsive means, supporting means for supporting one end of said transmitting means, a lever pivoted in said supporting means and engaging the lower end of said transmitting means, a push rod associated with said lever, slidable means mounted in said supporting means for moving said push rod, an operating rod attached to one end of said push rod and movable therewith, latch mechanism associated with the other end of said operating rod, a fuel supply valve, a valve stem therefor, a bracket for supporting said valve stem, said valve stem having a grooved portion positioned to receive said latching mechanism, and means for controlling the position of said valve when said latch mechanism is in engagement.

7. In combination, means for supporting a pilot structure, thermally responsive means associated therewith, means for transmitting movement of said thermally responsive means for supporting one end of said transmitting means, pivoted means in said supporting means engaging the lower end of said transmitting means, a push rod associated with said pivoted means, sliding means mounted in said supporting means for moving said push rod, an operating rod attached at one end to said push rod and movable therewith, latch mechanism associated with said operating rod, a fuel supply valve, a valve stem therefor, means for supporting said valve stem, said latching mechanism being positioned to engage said valve stem, and means for controlling the position of said valve when said latch mechanism is in engagement.

8. In combination, means for supporting a pilot structure, thermally responsive means associated therewith, transmitting means connected to said thermally responsive means, supporting means for supporting said transmitting means, means associated with said supporting means for engaging said transmitting means, a push rod associated with said last means, means for permitting sliding movement of said push rod, connecting means attached at one end to said push rod and movable therewith, latch mechanism attached to the other end of said connecting means, a fuel supply valve, a valve stem therefor, means for supporting said valve stem, said latch mechanism being positioned to engage said valve stem, and means for controlling the position of said valve when said latch mechanism is in engagement.

9. In combination, means for supporting a pilot structure, thermally responsive means responsive to the heat of said pilot, transmitting means operable to transmit movement of said thermally responsive means, pivoted lever means engaged by said transmitting means, cooperating control transmitting means engaged by said pivoted lever means, latch mechanism actuated thereby, a fuel valve, a valve stem therefor, said latch mechanism being operable to engage said valve stem upon actuation of said control transmitting means, control means comprising an indicating control knob and a pivoted control arm connected to and actuated by rotation of said knob, said control means being operable to adjust the position of said valve when said latch mechanism is in engagement.

10. In combination, a selecting mechanism comprising a control knob and motion transmitting means connected thereto, a valve housing a fuel supply valve therein having a grooved valve stem, a spring normally tending to close said valve, a pivoted operating lever slidably receiving said stem and connected to said motion transmitting means, latching mechanism carried by said lever engageable with said grooved stem to connect said stem to said lever, flexible control transmitting means connected to said latching mechanism, means for maintaining a pilot flame, and means responsive to the heat of said pilot flame and operable to withdraw said latching mechanism from engaged position upon extinguishment of said pilot flame.

11. In combination, a selecting mechanism comprising a control knob and motion transmitting means connected thereto, a valve housing, a fuel supply valve therein having a grooved valve stem, spring means normally tending to close said valve, a pivoted operating lever slidably receiving said stem and actuated by said motion transmitting means, latching mechanism carried by said lever engageable with said grooved stem to connect said stem to said lever, flexible control transmitting means connected to said latching mechanism, means for maintaining a pilot flame, thermally sensitive means responsive to said pilot flame, means connecting said thermally sensitive means to said flexible control transmitting means, and means carried by said flexible motion transmitting means and operable to withdraw said latching mechanism from engaged position upon extinguishment of said pilot flame.

12. In combination, means for maintaining a pilot flame, thermally sensitive means responsive to said flame, a housing, means supporting said pilot flame means above said housing, a lever pivoted in said housing, a plunger slidable in said housing and normally engaged at one end by said lever, flexible motion transmitting means extending from the opposite end of said plunger, means operable to move said plunger with respect to said housing, spring means tensioning said plunger against said lever, a valve housing, a fuel supply valve therein having a grooved valve stem, spring means normally tending to close said valve, latch mechanism engageable with said stem and connected to said flexible transmitting means, selecting means engageable with said latch mechanism to position said valve stem in a predetermined open position, and means transmitting movement from said thermally sensitive means to said lever and operable to disengage said lever for effecting release of said latch mechanism upon extinguishment of said pilot flame.

13. In combination, a fuel supply valve comprising a valve member, a seat therefor, spring means normally tending to close said valve, a valve stem provided with an annular groove extending from said valve, a hangar guiding movement of said valve stem, a control lever pivoted to said hangar, said lever having a portion thereof slidably receiving said stem, a latch device carried by said lever and engageable in the groove in said valve stem to provide conjoint movement of said lever and said stem, and remote thermally controlled means operable to release said latch device from engagement to close said valve under pressure of said spring means.

14. In a device of the class described, a pilot head having a pilot outlet and a mixing chamber open to atmosphere and in communication with said pilot outlet, gas supply means opening into said mixing chamber for supplying gas to said pilot outlet, a bi-metallic strip secured to said pilot head in proximity to the pilot outlet and having an extending strip, a rod carried by said strip, a valve housing having a valve therein normally urged toward closed position, and setting mechanism engaging with said valve to maintain said valve in open position including a pivoted lever engaged at one end by said rod, movement of said rod due to contraction of said bi-metallic strip tripping said lever to release said setting mechanism from engagement with said valve.

15. In combination, a valve housing, a normally closed valve therein having a grooved valve stem extending through said housing, a U-shaped bracket mounted on said housing and having guide means receiving said stem, a manually operable latch carrier pivoted on said bracket and shiftable axially of said stem, latching means reciprocatory in said carrier and engageable in said grooved stem to connect said valve for conjoint movement with said stem, and thermally sensitive means operable to release said latching means from engagement in said grooved stem.

16. In combination, a valve housing, a normally closed valve therein having a grooved valve stem extending through said housing, a U-shaped bracket mounted on said housing and having guide means receiving said stem, a manually operable latch carrier pivoted on said bracket and shiftable axially of said stem, latching means reciprocatory in said carrier and engageable in said grooved stem to connect said valve for conjoint movement with said stem, thermally sensitive means operable to release said latching means from engagement in said grooved stem, and manual means operable to return said latching means into engagement with said stem.

17. In combination, a valve housing, a valve member therein having an extending valve stem, means engaging about said extending stem and manually shiftable with respect thereto, pilot flame means, means carried by and reciprocatory within said manually shiftable means for locking the same to said stem to provide for conjoint movement therebetween, and thermally sensitive means operable upon extinguishment of the pilot flame to effect release of said locking means.

18. In combination, means for maintaining a pilot flame, thermally responsive means comprising motion transmitting means and a bimetallic strip responsive to said pilot flame, supply valve means, latch means comprising a spring operated pivoted lever arm engaged at one end by said motion transmitting means, spring responsive control transmitting means engaged by said motion transmitting means including a latch operable to engage the valve means and normally held in engaged position by said lever arm, and control means for opening said valve means selectively to a predetermined extent.

19. In combination, means for maintaining a pilot flame, thermally responsive means responsive to said pilot flame, supply valve means including a valve stem, latch means therefor comprising a pivoted lever arm and spring responsive control transmitting means engageable by said thermally responsive means and including a latch operable to releasably engage said valve stem, said latch being released from said valve stem upon extinguishment of said pilot flame, and control means engaging said latch and extending about said stem comprising a pivoted control arm connected to indicating means and adapted to open said valve to a predetermined extent when said latch is engaged with said stem.

20. In combination, means for maintaining a pilot flame, thermally responsive means including a bi-metallic strip responsive to said pilot flame, supply valve means, said supply valve means having a valve stem carried thereby, latch means comprising a spring operated pivoted lever arm and spring responsive control transmitting means engaged by said thermally responsive means, said lever arm in normal position tensioning said control transmitting means, motion transmitting means between said thermally responsive means and said arm and operable in response to actuation of said thermally responsive means to disengage said valve stem upon extinguishment of said pilot flame, and control means comprising a pivoted lever arm connected at one end to an indicating means for opening said valve to a predetermined extent.

WARREN W. SACKETT.